(12) United States Patent
Krisher et al.

(10) Patent No.: US 7,458,911 B2
(45) Date of Patent: Dec. 2, 2008

(54) DRIVE SYSTEM FOR MOTOR VEHICLE

(75) Inventors: James A. Krisher, Fort Wayne, IN (US); Kenneth E. Cooper, Toledo, OH (US); Thomas L. Nahrwold, Swanton, OH (US); Gordon W. Hunt, Roanoke, IN (US); Ralph W. Baxter, Jr., Fort Wayne, IN (US); Randy Sommer, Monroeville, IN (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 284 days.

(21) Appl. No.: 11/186,927

(22) Filed: Jul. 22, 2005

(65) Prior Publication Data
US 2006/0169564 A1    Aug. 3, 2006

Related U.S. Application Data

(63) Continuation-in-part of application No. 11/048,047, filed on Feb. 2, 2005, now abandoned.

(51) Int. Cl.
*F16H 48/22* (2006.01)

(52) U.S. Cl. ......... 475/86; 192/3.58
(58) Field of Classification Search ......... 475/239, 475/86
See application file for complete search history.

(56) References Cited

U.S. PATENT DOCUMENTS

| | | | |
|---|---|---|---|
| 2,401,628 A | 6/1946 | Eksergian | |
| 3,081,836 A | 3/1963 | Hill | |
| 3,439,785 A | 4/1969 | Hughson | |
| 3,690,426 A | 9/1972 | Weisgerber | |
| 4,015,482 A | 4/1977 | Ito et al. | |
| 4,111,287 A | 9/1978 | Daniels et al. | |
| 4,142,614 A | 3/1979 | Fujioka | |
| 4,152,894 A | 5/1979 | Rumyantsev et al. | |
| 4,227,597 A | 10/1980 | Gierer | |
| 4,284,182 A | 8/1981 | Hakes et al. | |
| 4,702,336 A | 10/1987 | Seibert et al. | |
| 4,753,131 A | 6/1988 | Wupper | |
| 4,871,043 A | 10/1989 | Fujii et al. | |

(Continued)

FOREIGN PATENT DOCUMENTS

CA    2492481 A1 * 10/2003

(Continued)

*Primary Examiner*—Richard M. Lorence
(74) *Attorney, Agent, or Firm*—Berenato, White & Stavish

(57) ABSTRACT

A drive system designed to use a vehicle's existing hydraulic system to operate a controllable limited slip differential assembly. The limited slip differential assembly may be associated with the front axle, the rear axle, or the driveline between the front and rear axles. The differential assembly may also be used in combination that includes front, rear, or intermediate differential assemblies. The drive system further includes a friction clutch assembly for selectively engaging and disengaging an input member with an output member of the differential assembly, a fluid clutch actuator for selectively frictionally and variably loading the clutch assembly, and a fluid pump that is a common source of pressurized fluid for the fluid clutch actuator and the existing hydraulic system of the motor vehicle other than the fluid clutch actuator of the drive system. The fluid clutch actuator is actuated by fluid pressure generated by the fluid pump.

16 Claims, 17 Drawing Sheets

U.S. PATENT DOCUMENTS

| | | | |
|---|---|---|---|
| 4,934,213 A | 6/1990 | Niizawa | |
| 4,934,497 A | 6/1990 | Ishizeki et al. | |
| 4,974,696 A * | 12/1990 | Miyajima et al. | 180/248 |
| 5,293,952 A * | 3/1994 | Ledamoisel et al. | 180/422 |
| 5,454,762 A | 10/1995 | Sawase et al. | |
| 5,562,192 A | 10/1996 | Dick | |
| 5,688,202 A | 11/1997 | Bowen | |
| 5,818,678 A | 10/1998 | Berg et al. | |
| 5,899,951 A | 5/1999 | Babbel et al. | |
| 6,102,829 A * | 8/2000 | Muddell et al. | 477/77 |
| 6,386,351 B1 | 5/2002 | Salecker et al. | |
| 6,418,714 B1 | 7/2002 | Johnson et al. | |
| 6,540,059 B2 | 4/2003 | Drexl | |
| 6,575,283 B2 | 6/2003 | Drexl et al. | |
| 6,578,692 B2 | 6/2003 | Porter | |
| 6,622,837 B2 | 9/2003 | Ochab et al. | |
| 6,712,166 B2 | 3/2004 | Rush et al. | |
| 6,848,548 B2 | 2/2005 | Alfredsson | |
| 2003/0192762 A1 | 10/2003 | Peura | |
| 2003/0196866 A1 | 10/2003 | Keener | |
| 2004/0059494 A1 | 3/2004 | Yoneda | |
| 2004/0159520 A1 | 8/2004 | Anwar et al. | |
| 2005/0116537 A1* | 6/2005 | Zalewski et al. | 303/139 |
| 2005/0126875 A1* | 6/2005 | Bruder | 192/13 R |

FOREIGN PATENT DOCUMENTS

| | | |
|---|---|---|
| EP | 0 736 409 B1 | 3/2000 |
| JP | 62023822 A * | 1/1987 |
| JP | 2000046003 A * | 2/2000 |

* cited by examiner

DRIVE SYSTEM FOR MOTOR VEHICLE

CROSS-REFERENCE TO RELATED APPLICATION

This application is a continuation-in-part of application Ser. No. 11/048,047, filed on Feb. 2, 2005 now abandoned.

BACKGROUND OF THE INVENTION

1. Field of the Invention

The present invention relates to drive systems for motor vehicles in general, and more specifically, a vehicular drive system including a fluidly actuated friction clutch assembly actuated with a fluid pump integrated with one of hydraulic systems of the motor vehicle.

2. Description of Related Art

Differential assemblies are arranged in the power transmission system of a motor vehicle to allow a pair of output shafts operatively coupled to an input shaft to rotate at different speeds, thereby allowing the wheel associated with each output shaft to maintain traction while the vehicle is turning. The differential distributes the torque provided by the input shaft between a first and second output shaft. The most basic and common type of differential is known as an open differential.

Although open differentials may be adequate for most driving conditions, they are generally unsuitable for slippery conditions where one wheel experiences a much lower coefficient of friction than the other wheel. If one wheel of a vehicle is located on a patch of ice or mud and the other wheel is on dry pavement, the wheel experiencing the lower coefficient of friction loses traction. If even a small amount of torque is directed to the wheel without traction, the torque will cause the wheel to "spin out". Since the maximum amount of torque that can be developed on the wheel with traction is equal to torque on the spinning wheel without traction, the engine is unable to develop any torque and the wheel with traction is unable to rotate. The spin out results in an overspeed of the shaft associated with the spinning wheel (the first shaft) relative to the shaft associated with the wheel with traction (second shaft). To address this problem, a differential has been developed that limits the rotational speed of first shaft relative to the speed second shaft so that torque is directed to the shaft associated with the wheel that has traction (the second shaft). Such differential assemblies are typically called limited slip differentials.

Limited slip differentials can be used in front or rear axle drive systems. In addition to limiting slip by reducing the difference between the speed of two wheels (shafts) on a common axle, limited slip differentials can also be used in other clutch-type applications that require torque to be selectively transferred from an input shaft to a single output shaft. For example, a limited slip differential can be used in the driveline between the front and rear axles.

Limited slip differentials can be either actively or passively controlled. In a passively controlled limited slip differential, when the first output shaft begins to overspeed, force from the input shaft is automatically redirected from the first output shaft to the second output shaft, thereby retarding the speed of the first shaft and redirecting the torque to the second shaft. Actively controlled differential systems control the amount of torque directed to each of the output shafts based on the configuration and programming of the actively controlled system. When the relative rotational speed of a first shaft exceeds a pre-determined threshold, a variable amount of hydraulic pressure is directed to a multi-disc clutch pack within the actively controlled differential. The variable pressure applied to the clutch pack allows a selective amount of engagement between the input shaft and the output shafts associated with each wheel so that the rotational speed of the overspeeding first shaft is retarded and torque is directed to the second shaft.

Hydraulic power to engage the clutch pack can be generated in various ways including a specially dedicated remotely located hydraulic pump powered by the engine, or through a pumping system that is integral with the differential, such as a gerotor pump. However, both of these types of designs increase the complexity of the system and expenditures on materials.

The need exists for an apparatus that utilizes an existing hydraulic system to provide the hydraulic pressure to an active differential controller. The current invention integrates the differential control mechanism with one of hydraulic systems of the motor vehicle exterior to the limited slip differential. This design significantly reduces overall system complexity and cost, and increases system control capability.

SUMMARY OF THE INVENTION

The present invention is a drive system for a motor vehicle including a friction clutch assembly that utilizes pressurized fluid supplied by a fluid pump that is also a common source of pressure for one of hydraulic systems of the motor vehicle exterior to the friction clutch assembly. The friction clutch assembly selectively engages and disengages an input shaft with at least one output shaft. The clutch assembly comprises a multi-disk clutch pack having outer clutch plates coupled to the input shaft, and inner clutch plates coupled to the output shaft. The invention further comprises a fluid clutch actuator for selectively frictionally loading the clutch assembly. The fluid pump of one of the hydraulic systems of the motor vehicle exterior to the friction clutch assembly fluidly actuates a clutch actuator to selectively load the clutch assembly. The fluid pump increases the fluid pressure to the clutch actuator to load the clutch assembly, and allows the fluid pressure to decrease to unload the clutch assembly. The friction clutch assembly may also be selectively partially engaged at points in between full engagement and full disengagement.

DETAILED DESCRIPTION OF PREFERRED EMBODIMENTS

Figure 1:
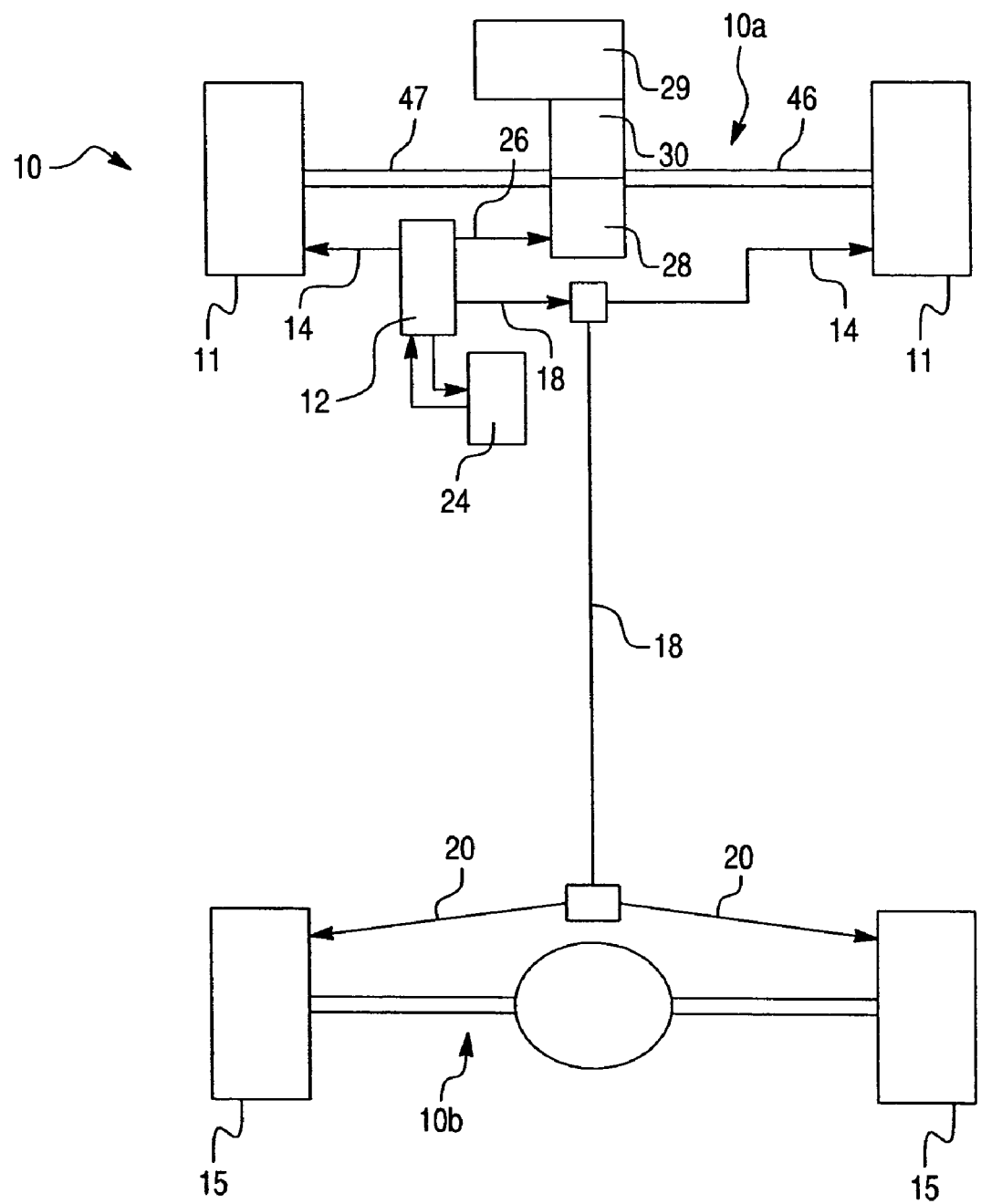
FIG. 1 is a schematic of a first exemplary embodiment of the present invention in a front-wheel-drive vehicle.

As best shown in FIG. 1, the first exemplary embodiment of the present invention comprises a drive system 10 that is integrated into an antilock brake system of a motor vehicle having a front axle 10a and a rear axle 10b. The antilock brake system comprises a hydraulic brake pump 12 which provides pressurized hydraulic fluid to the brake system. The brake system also includes front brake supply lines 14 supplying brake fluid to the front wheels 11, and intermediate 18 and rear 20 brake fluid supply lines supplying brake fluid to rear wheels 15. The antilock brake system is controlled by an antilock brake system control module 24.

As best shown in FIG. 1, the hydraulic brake pump 12 and the antilock brake system control module 24 are also components of the drive system. In the embodiment shown in FIG. 1, the hydraulic brake pump 12 supplies pressurized hydraulic fluid through a front differential supply line 26 to a front controllable limited slip differential assembly 28. The front limited slip differential assembly 28 is disposed in the front transaxle housing adjacent to a power transmission 30 between two output shafts 46, 47 defining output members of the differential assembly 28. An output shaft connects the transmission 30 and the differential assembly 28. A pressure control valve operably associated with the pump 12 controls the pressure within the front differential supply line.

Figure 2:
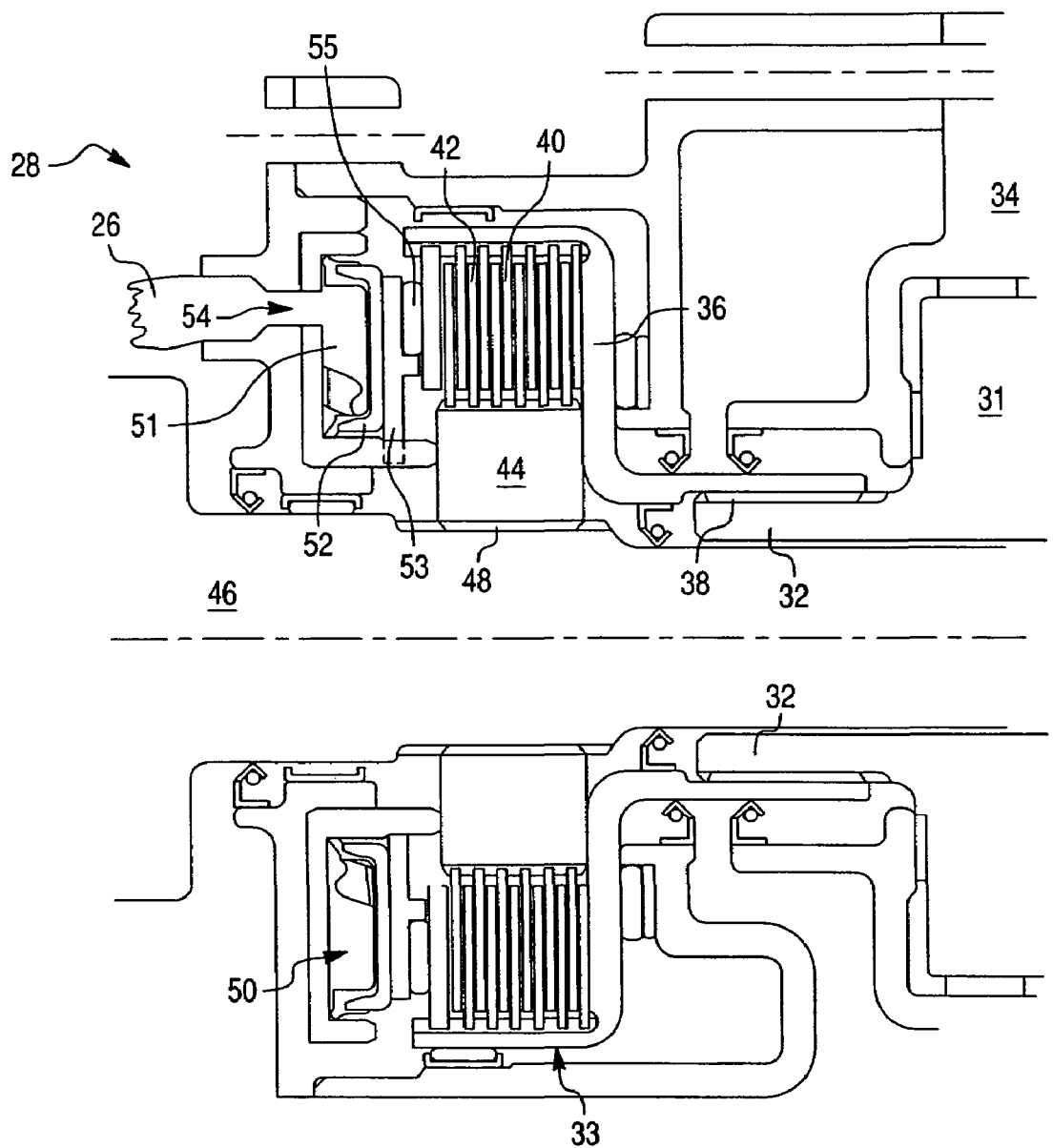
FIG. 2 is a partial cross-section of a friction clutch assembly of a front limited slip differential.
Figure 2A:
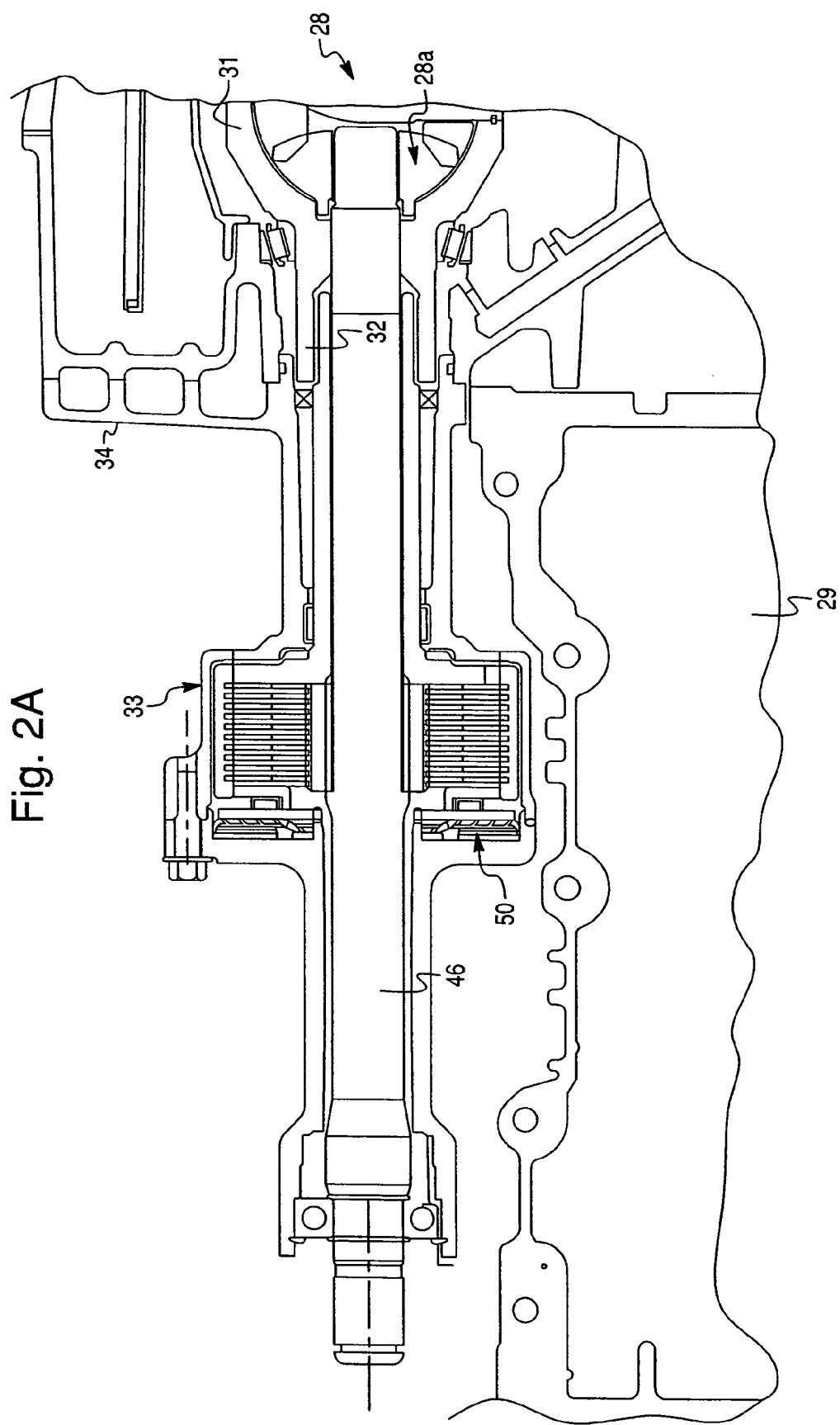
FIG. 2A is a partial cross-section of the front limited slip differential.
Figure 3:
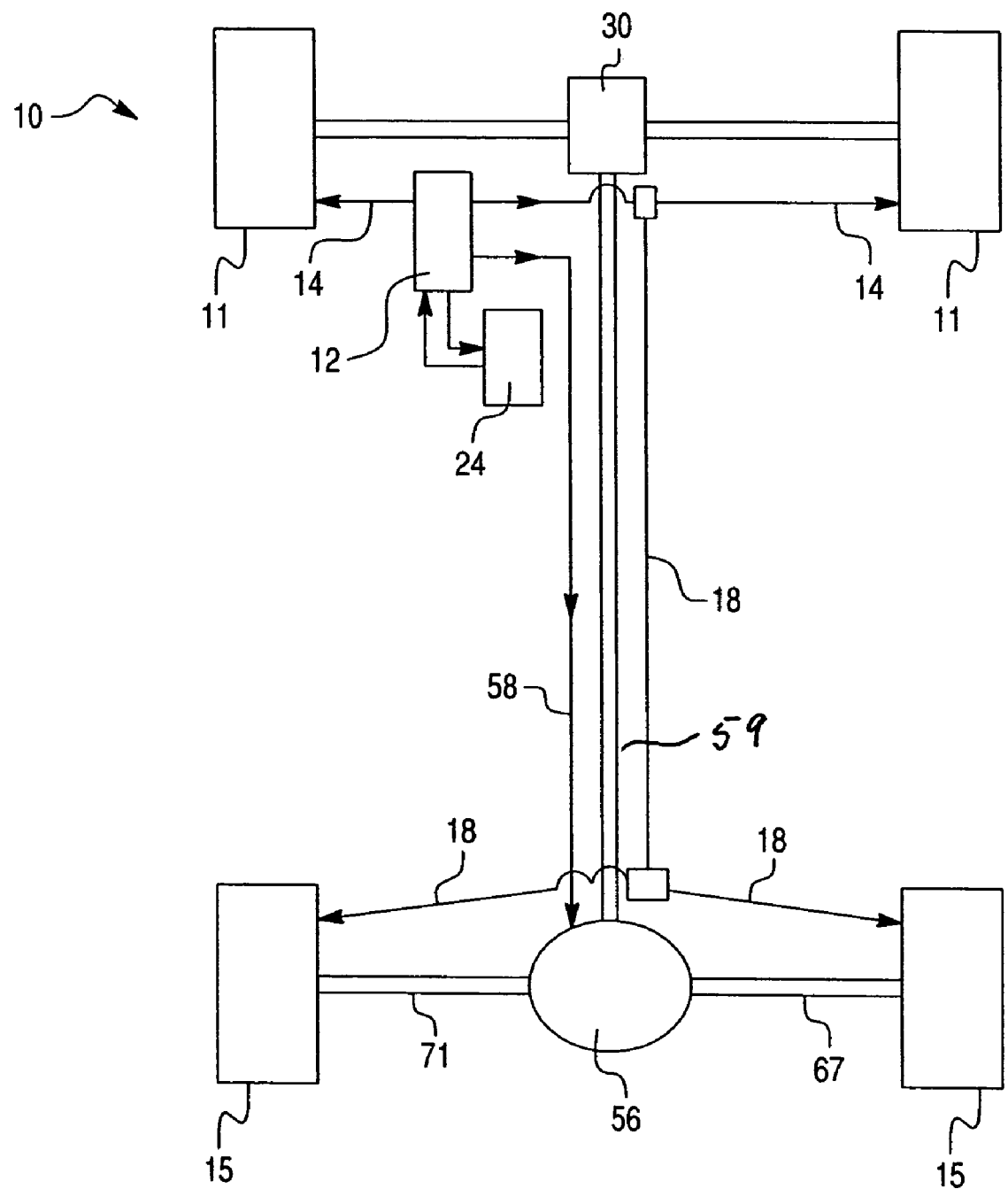
FIG. 3 is a schematic of the first exemplary embodiment of the present invention in a rear-wheel-drive vehicle.

As best shown in FIGS. 2 and 3, the front limited slip differential assembly 28 comprises a differential case 31 housing a differential gear assembly 28a and having a trunion extension 32 that is rotatably mounted inside a front wheel drive transaxle housing 34, and a hydraulically actuated friction clutch assembly 33. The differential case 31 is operatively coupled to the power transmission 30 through a final drive (not shown) and defines an input member of the differential assembly 28. The differential case trunion extension 32 is connected to an outer clutch sleeve 36 of the friction clutch assembly 33 at a differential case spline joint 38. The friction clutch assembly 33 further includes multiple outer clutch disks 40 attached to the outer clutch sleeve 36 and extending inwardly. The outer clutch disks 40 are interleaved with inner clutch disks 42 that are attached to an inner clutch sleeve 44. The inner clutch sleeve 44 is attached to a first output shaft 46 at spline joint 48. A second output 47 shaft operatively connected to the differential case 32 and extending opposite the first output shaft 46 is shown in FIG. 1, but is not visible in FIG. 2. FIG. 2A also shows a cross-section of the front wheel drive embodiment of the present invention.

As best shown in FIG. 1, in operation, the antilock brake system control module 24 signals control valves operatively associated with the hydraulic pump 12 to engage the front controllable limited slip differential assembly 28. The antilock brake system includes control algorithms integrating the antilock brake system control with the function of the limited slip differential. In response to the signal from the antilock brake system control module 24, the hydraulic pump 12 increases the hydraulic pressure applied to the differential assembly 28 through the differential supply line 26 by supplying pressurized hydraulic fluid to the differential assembly 28.

As best shown in FIG. 2, hydraulic fluid is directed through the differential supply line 26 and into a fluid clutch actuator 50 including a piston reservoir 51, a piston 52 disposed in the piston reservoir 51, a thrust plate 53 and a thrust bearing 55. The hydraulic pressure bears on the piston 52 which extends in the direction indicated by the arrow 54. The piston 52 engages the thrust plate 53 and the thrust bearing 55 so that the inner clutch plates 42 frictionally engage the outer clutch plates 40 and thereby variably couple the differential case trunion extension 32 with the output shaft 46. The lateral pressure applied by the piston 52 determines the degree of engagement between the differential case 32 and the output shaft 46. In response to a sensed differential speed between the two output shafts 46, 47, the clutch actuator 50 may be variably engaged to selectively increase the limiting force applied to the overspeeding shaft 47 thereby retarding the overspeeding shaft 47 and increasing the torque directed to the opposite output shaft 46, so that the differential speed between the shafts 46, 47 is limited.

To unload or reduce the torque transferred by the clutch pack 40, 42, pressure within the front differential supply line 26 and the reservoir 51 is reduced so that the piston 52 retracts within the reservoir 51 and the outer clutch plates 40 at least partially disengage with the inner clutch plates 42. In effect, the piston 52 is reciprocated by the hydraulic pressure generated by the by the pump 12 so that the pump 12 selectively increases hydraulic pressure to the piston 52 to load the clutch pack 40, 42 and selectively decreases hydraulic pressure to unload the clutch pack 40, 42.

As best shown in FIG. 3, the rear controllable limited slip differential 56 is configured in a similar manner as the front controllable differential assembly 28. The rear differential 56 is housed in the rear end housing between two output shafts 67, 71, and receives pressurized hydraulic fluid from the hydraulic pump 12 through a rear differential fluid supply line 58. The differential assembly 56 is connected to the transmission 30 by an input shaft 59. The hydraulic pump 12 is controlled by the antilock brake system control module 24 in the same manner as described above with regard to the front limited slip differential assembly 28.

Figure 4:
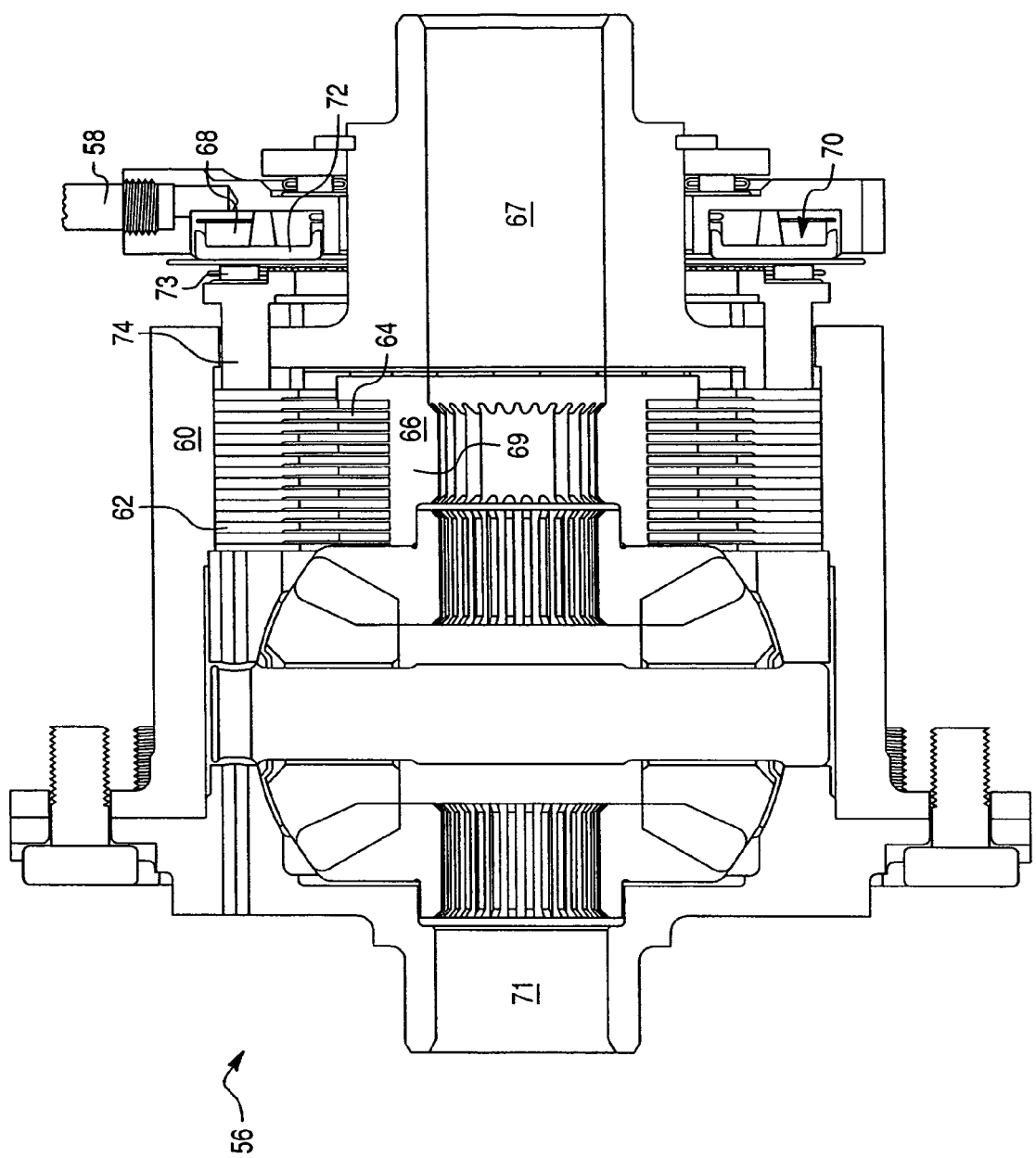
FIG. 4 is a partial cross-section of a rear limited slip differential.
Figure 4A:
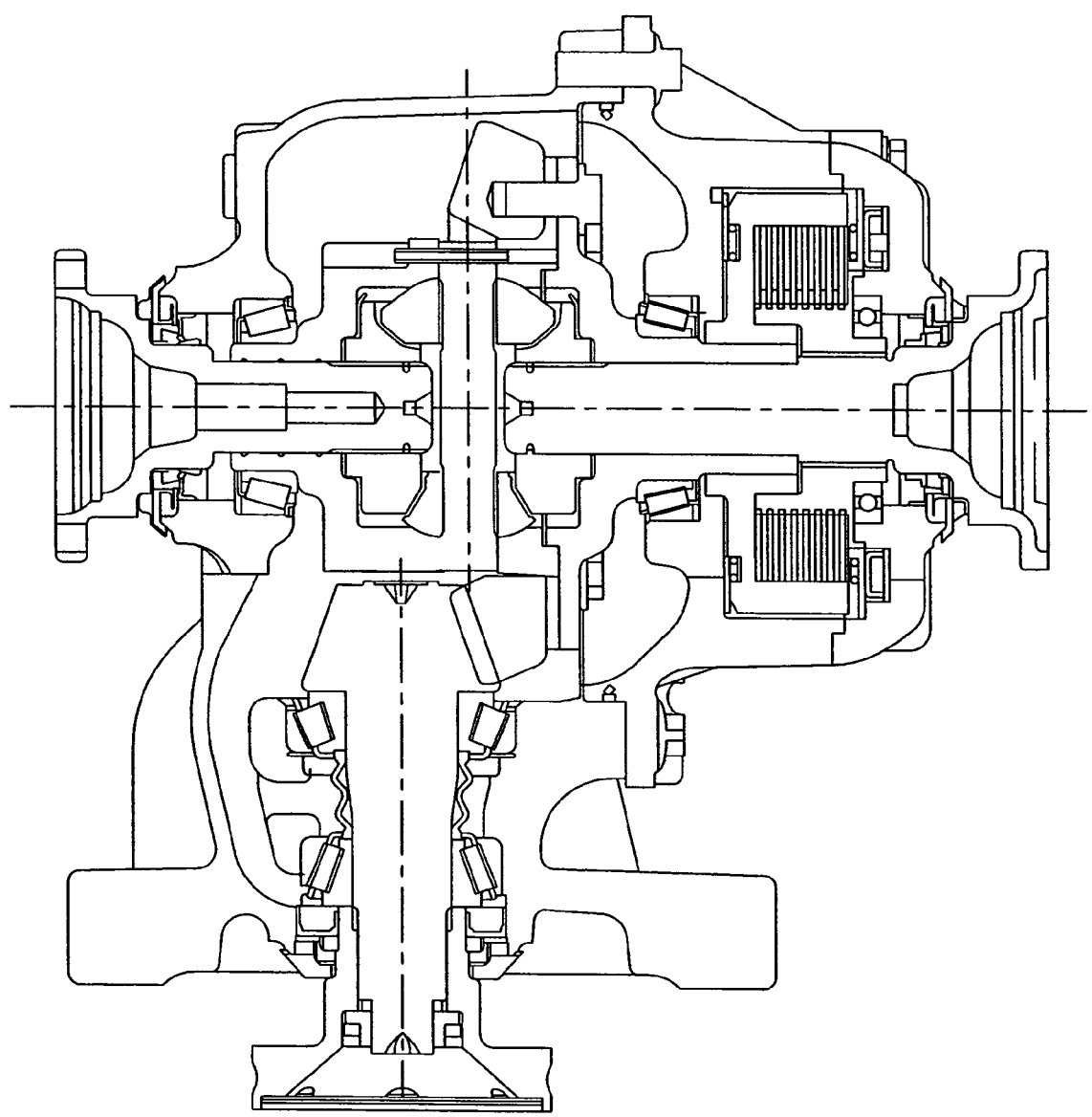
FIG. 4A is a partial cross-section of a rear final drive and the rear limited slip differential.

As best shown in FIG. 4, the rear limited slip differential 56 is comprised of a differential case 60. The differential case 60 includes multiple outer clutch disks 62 extending inwardly. The outer clutch disks 62 are interleaved with inner clutch disks 64 that are attached to an inner clutch sleeve 66. The inner clutch sleeve 66 is attached to an output shaft 67 at a spline joint 69. FIG. 4A also shows a cross-section of the rear wheel drive embodiment of the present invention.

As best shown in FIG. 3, in operation, the antilock brake system control module 24 signals the hydraulic pump 12 to supply pressurized fluid to the rear controllable limited slip differential 56. In response to the signal from the antilock brake system control module 24, the hydraulic pump 12 increases the hydraulic pressure applied to the differential 56 through the differential supply line.

As best shown in FIG. 4, hydraulic fluid is directed through the differential supply line 58 and into a piston reservoir 68. The hydraulic pressure bears on a piston 72 of a hydraulic clutch actuator 70 so that the piston 72 engages a thrust plate 74 and a thrust bearing 73. The thrust plate 74 and thrust bearing 73 apply pressure on the clutch pack 62, 64 so that the inner clutch plates 64 frictionally engage the outer clutch plates 62 and thereby selectively engage the differential case 60 with the output shaft 67, based on the pressure directed to the piston 72, and the corresponding engagement of the clutch pack 62, 64 in the same manner as described above with regard to the front limited slip differential assembly 28.

To unload or reduce the torque transferred by the clutch pack 62, 64, pressure is reduced within the rear differential supply line 58 and reservoir 68 so that the piston 72 retracts within the reservoir 68 and the outer clutch plates 62 at least partially disengage with the inner clutch plates 64. In response to a sensed differential speed between the two output shafts 71, 67, the clutch actuator 70 is variably engaged to selectively increase the limiting force applied to the overspeeding shaft 71 thereby retarding the overspeeding shaft 71 and increasing the torque directed to the opposite output shaft 67 so that the differential speed between the shafts 67, 71 is limited.

Figure 5:
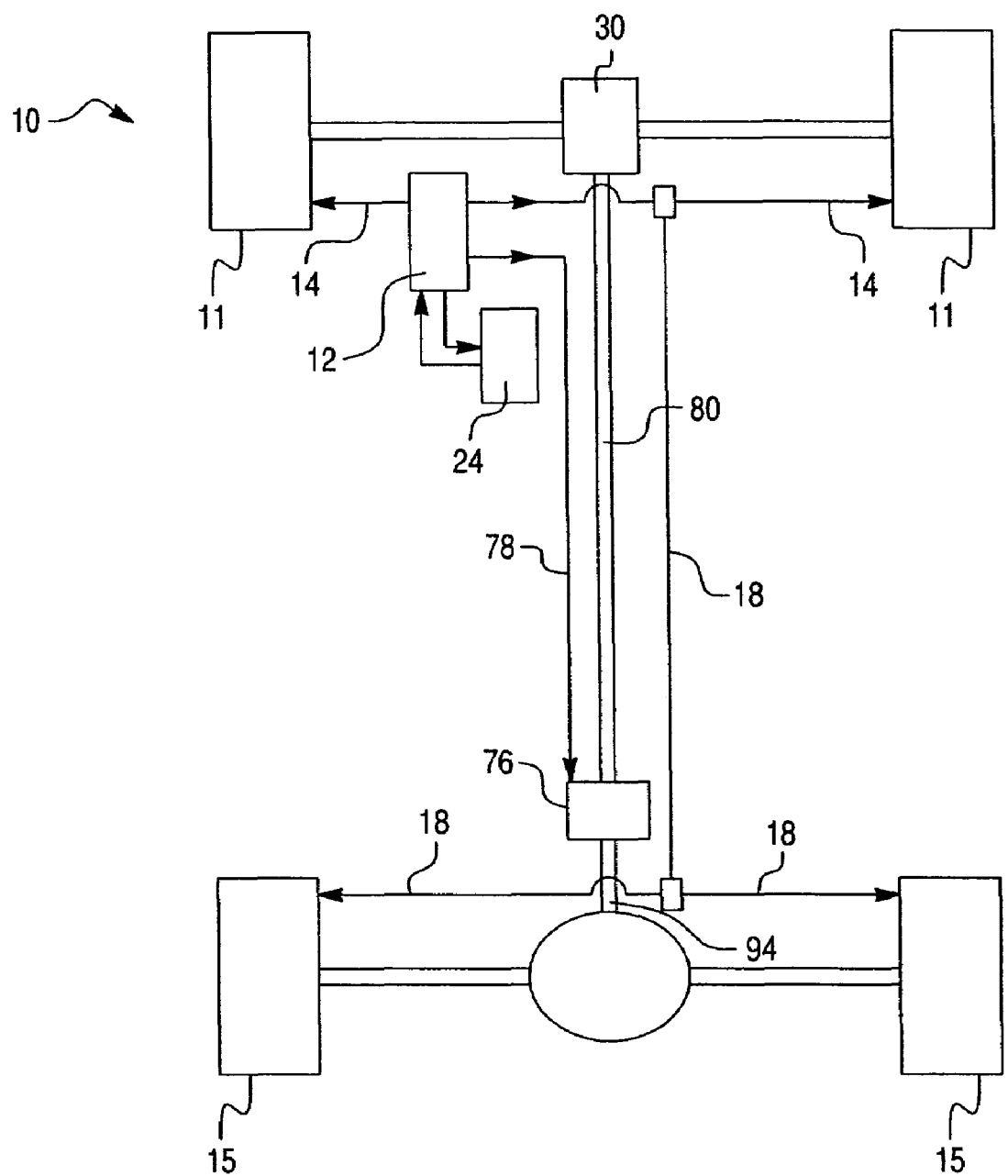
FIG. 5 is a schematic of an intermediate limited slip differential integrated into the drive line in an intermediate position between the front and rear axles.

As best shown in FIG. 5, an intermediate controllable limited slip torque coupling 76 is configured differently from the front 28 and rear 56 controllable limited slip differential assemblies in that the torque from the input shaft 80 is selectively directed to a single output shaft 94, rather than split between two output shafts. The intermediate differential 76 receives pressurized hydraulic fluid from the hydraulic pump 12 through the intermediate differential fluid supply line 78 to engage the intermediate torque coupling 76 and thereby direct torque to the rear vehicle's rear end. The hydraulic pump 12 is controlled by the antilock brake system control module 24 in the same manner as described above with regard to the front 28 and rear 56 limited slip differential assemblies.

Figure 6:
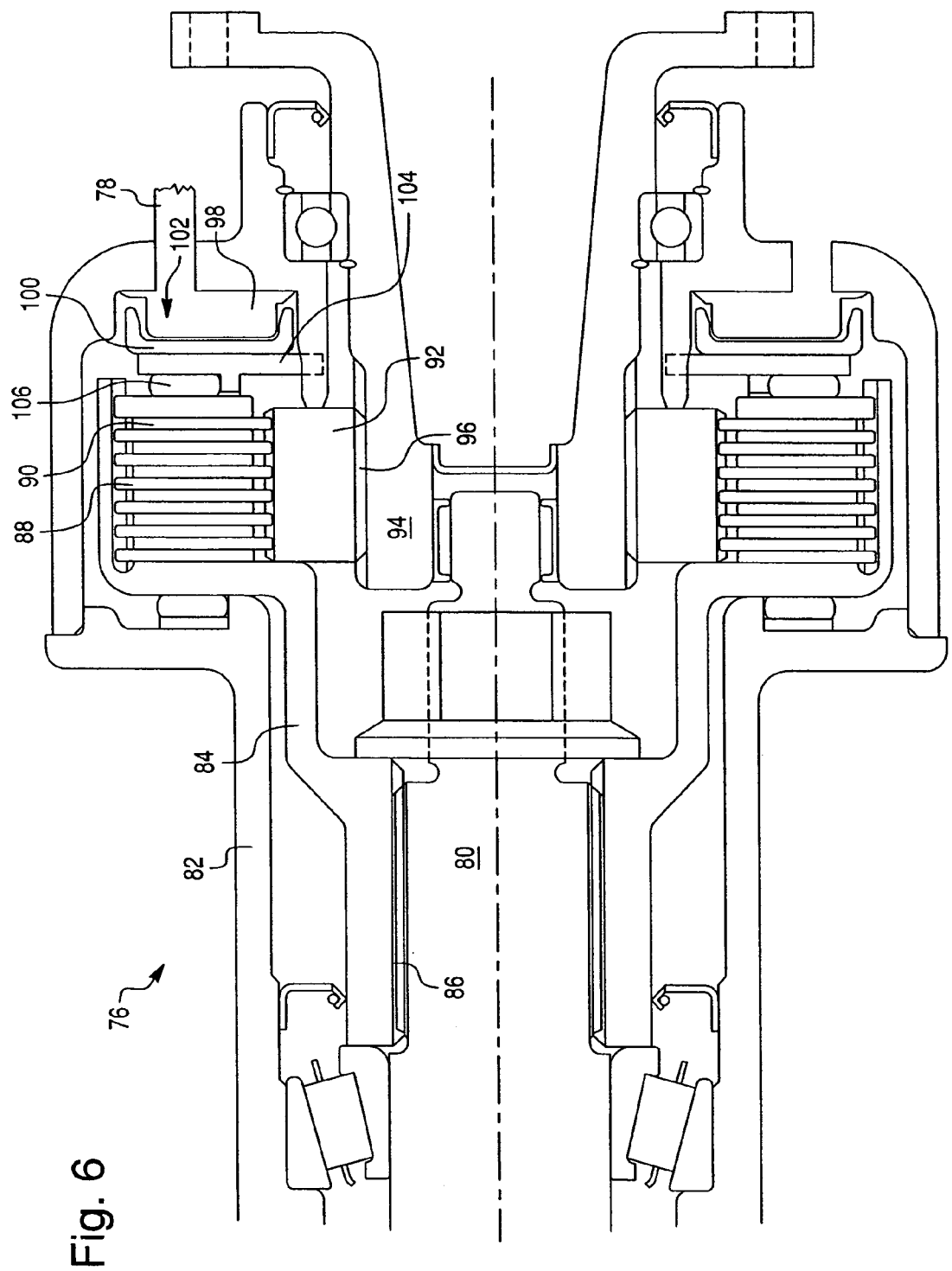
FIG. 6 is a partial cross-section of a friction clutch assembly of the intermediate limited slip differential.

As best shown in FIG. 6, the intermediate slip torque coupling 76 is comprised of an input shaft 80 that is rotatably mounted inside an intermediate housing 82. The input shaft 80 is connected is connected to an outer clutch sleeve 84 at a differential case spline joint 86. The outer clutch sleeve 84 includes multiple outer clutch disks 88 attached to the outer clutch sleeve 84 and extending inwardly. The outer clutch disks 88 are interleaved with inner clutch disks 90 that are attached to an inner clutch sleeve 92. The inner clutch sleeve 92 is attached to a hollow output shaft 94 at spline joint 96. In the preferred embodiment, the output shaft 94 may be hollow.

As best shown in FIG. 5, in operation, the antilock brake system control module 24 signals the hydraulic pump 12 to engage the intermediate controllable limited slip torque coupling 76. In response to the signal from the antilock brake system control module 24 and the need to address a limited slip condition, the hydraulic pump 12 increases the hydraulic pressure applied to the torque coupling 76 through the differential supply line 78.

As best shown in FIG. 6, hydraulic fluid is directed through the differential supply line 78 and into a piston reservoir 98. The hydraulic pressure bears on a piston 100 which extends in the direction indicated by the arrow 102. The piston 100 engages a thrust plate 104 and a thrust bearing 106 so that the inner clutch plates 90 frictionally engage the outer clutch plates 88 and thereby couple the input shaft 80 with the output shaft 94. In response to a sensed differential speed between the input shaft 80 and the output shaft 94, the clutch actuator 70 is variably engaged to selectively increase the limiting force applied to the overspeeding shaft 80 and thereby retarding the overspeeding shaft 80 and increase the torque directed to the output shaft 94 so that the differential speed between the shafts 80, 94 is limited To unload or reduce the torque transferred by the clutch pack 88, 90, pressure within the intermediate differential supply line 78 and reservoir 98 is reduced so that the piston 100 retracts within the reservoir 98 and the outer clutch plates 88 at least partially disengage with the inner clutch plates 90.

Figure 7:
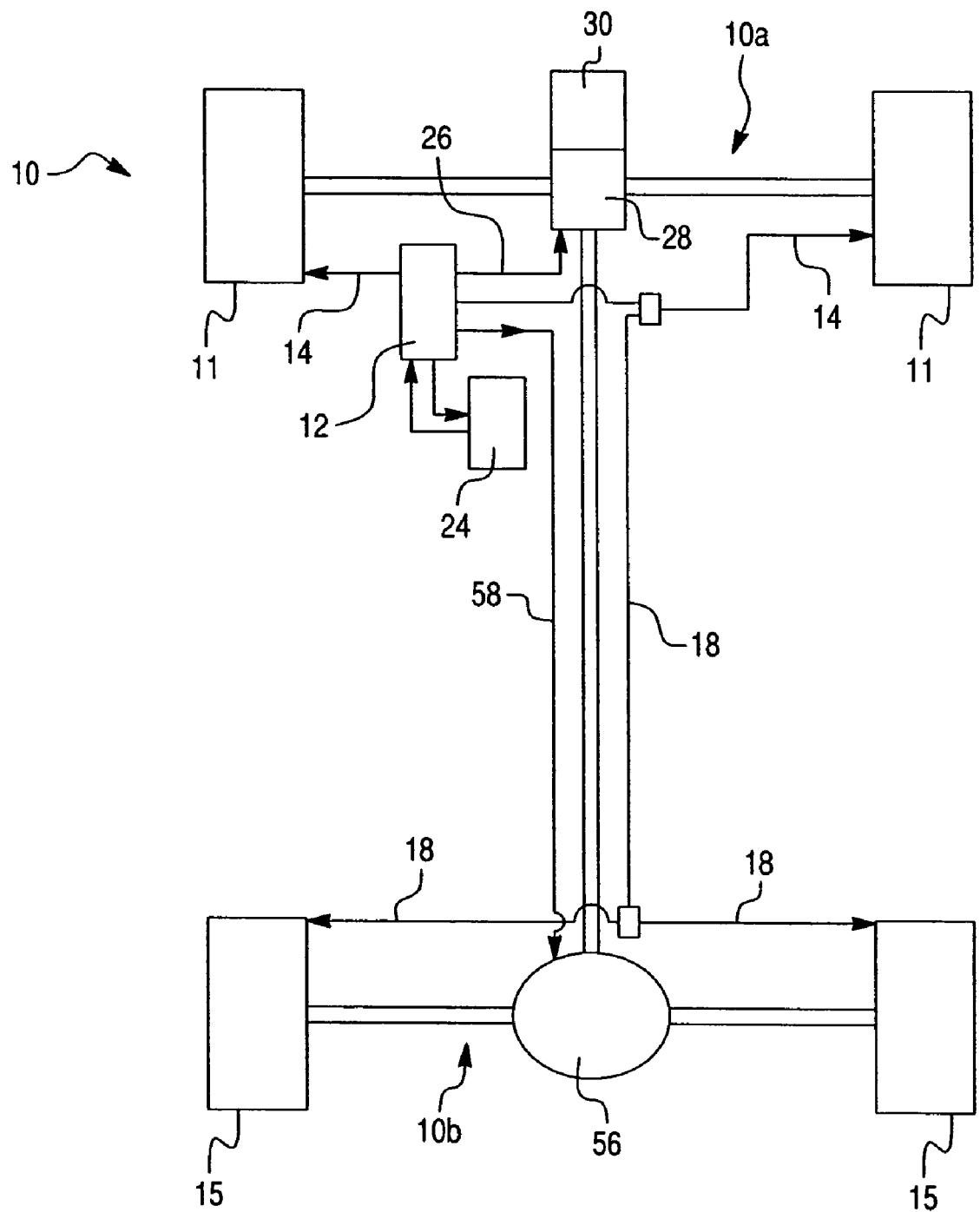
FIG. 7 is a schematic of the first exemplary embodiment of the present invention in an all-wheel-drive vehicle with front and rear limited slip differentials.

As best shown in FIG. 7, the current invention also includes combinations of the limited slip device configurations shown in FIGS. 1-6. FIG. 7 illustrates a combination of front 28 and rear 56 differential assemblies integrated into a single drive system 10 of the motor vehicle. Other combinations should also be considered within the scope of the art.

The multi-disk clutch configurations of the front, and rear limited slip differentials allow a variable and controllable amount of force to be communicated through the clutch packs 40, 42, 62, 64 to retard the relative rotation of two output shafts associated with the differentials. Force is communicated through the intermediate torque coupling clutch pack 88, 90 to selectively engage and disengage the front-to-rear drive line. When antilock brake control module 24 directs the hydraulic pump 12 to apply a maximum amount of hydraulic pressure to the piston assemblies 52, 70, 100, the hydraulic clutch packs 40, 42, 62, 64, 88, 90, are fully coupled and the limited slip function is fully enabled. When only a minimum hydraulic pressure is applied to the piston assemblies 52, 70, 100, the limited slip function is fully disabled. Between the fully engaged and fully disabled conditions, a variable amount of torque may be transmitted. The ability to control the limited slip function enables the vehicle performance to be adjusted to address various operating conditions. The limited slip function may also be adjusted in response to selected performance profiles.

Figure 8:
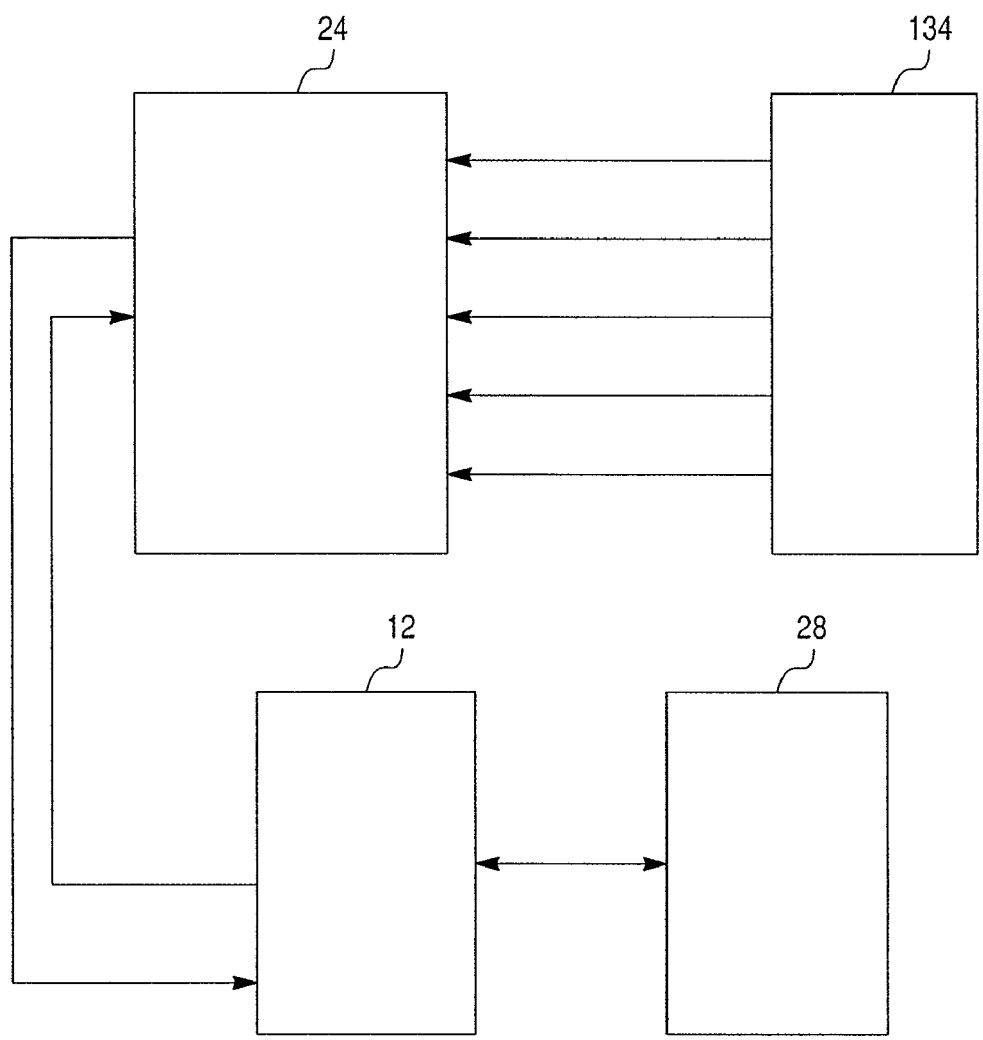
FIG. 8 is a schematic of an electronically controllable limited slip differential system according to the first exemplary embodiment of the present invention.

In the present invention, the amount of torque transferred may be autonomously controlled through control algorithms within a computer processor in the antilock brake control module 24. As best shown in FIG. 8, the antilock brake control module 24 makes control commands based on one or more vehicle sensors 134 that communicate information regarding operational parameters to the antilock brake control module 24.

The control module 24 may monitor parameters including but not limited to engine speed, vehicle speed, wheel rotational speed, yaw rate, lateral acceleration, steering angle, engine throttle position, brake application, ice detection, moisture detection, and/or driveline configuration. This information may be used to determine acceptable relative speed variations for shafts associated with the differential and to engage the differential to keep the differentials within the identified range. The control module 24 may use a mathematical algorithm to process the sensed information and communicate the resulting electrical commands to the hydraulic pump 12. As described above, the hydraulic pump 12 then modifies the hydraulic pressure directed to the controllable limited slip differential assembly(s) 28, 56, 76 to adjust performance of the drive system 10 of the motor vehicle. Information regarding the operating status of the differential(s) 28, 56, 76 is subsequently communicated back to the antilock brake system control module 24 to allow the control module 24 to adjust and fine-tune the differential control mechanism.

Figure 9:
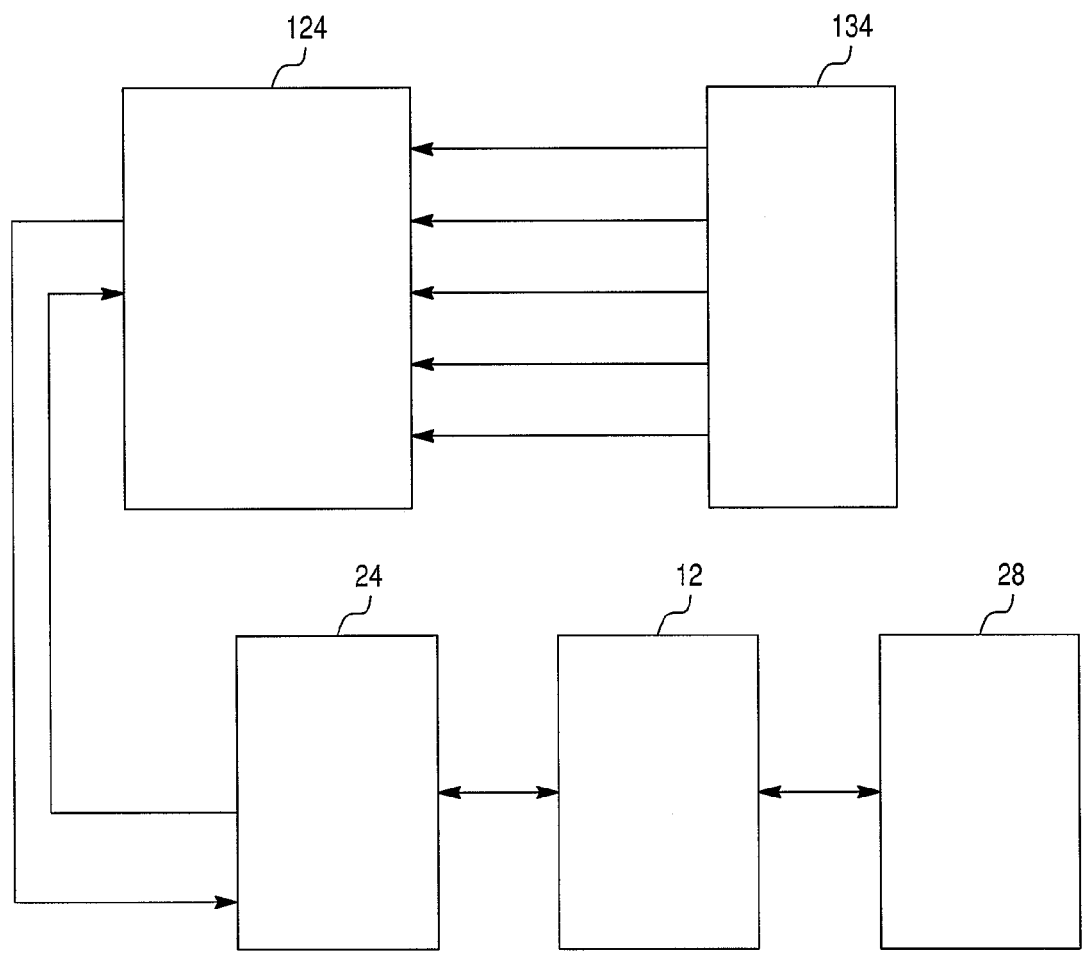
FIG. 9 is a schematic of an electronically controllable limited slip differential system according to the first exemplary embodiment of the present invention that includes a vehicle management computer.

As best shown in FIG. 9, one or more active vehicle management systems 124, such as a programmable yaw stability control system, can be used with the present invention. The active vehicle management systems may incorporate the antilock brake system, including the controllable limited slip differential assemblies 28, 56, 76 to optimize vehicle traction, maneuverability, and stability.

Figure 10:
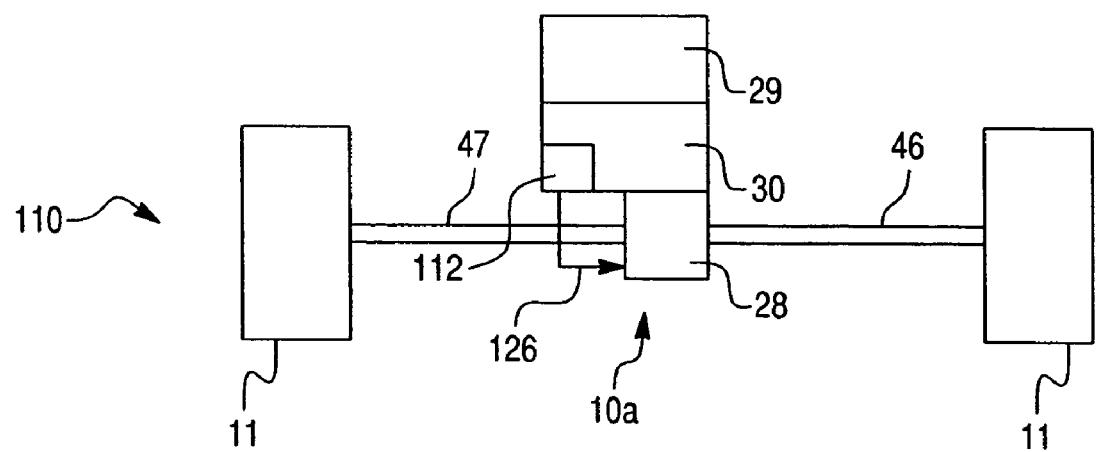
FIG. 10 is a schematic of a second exemplary embodiment of the present invention in the front-wheel-drive vehicle.
Figure 11:
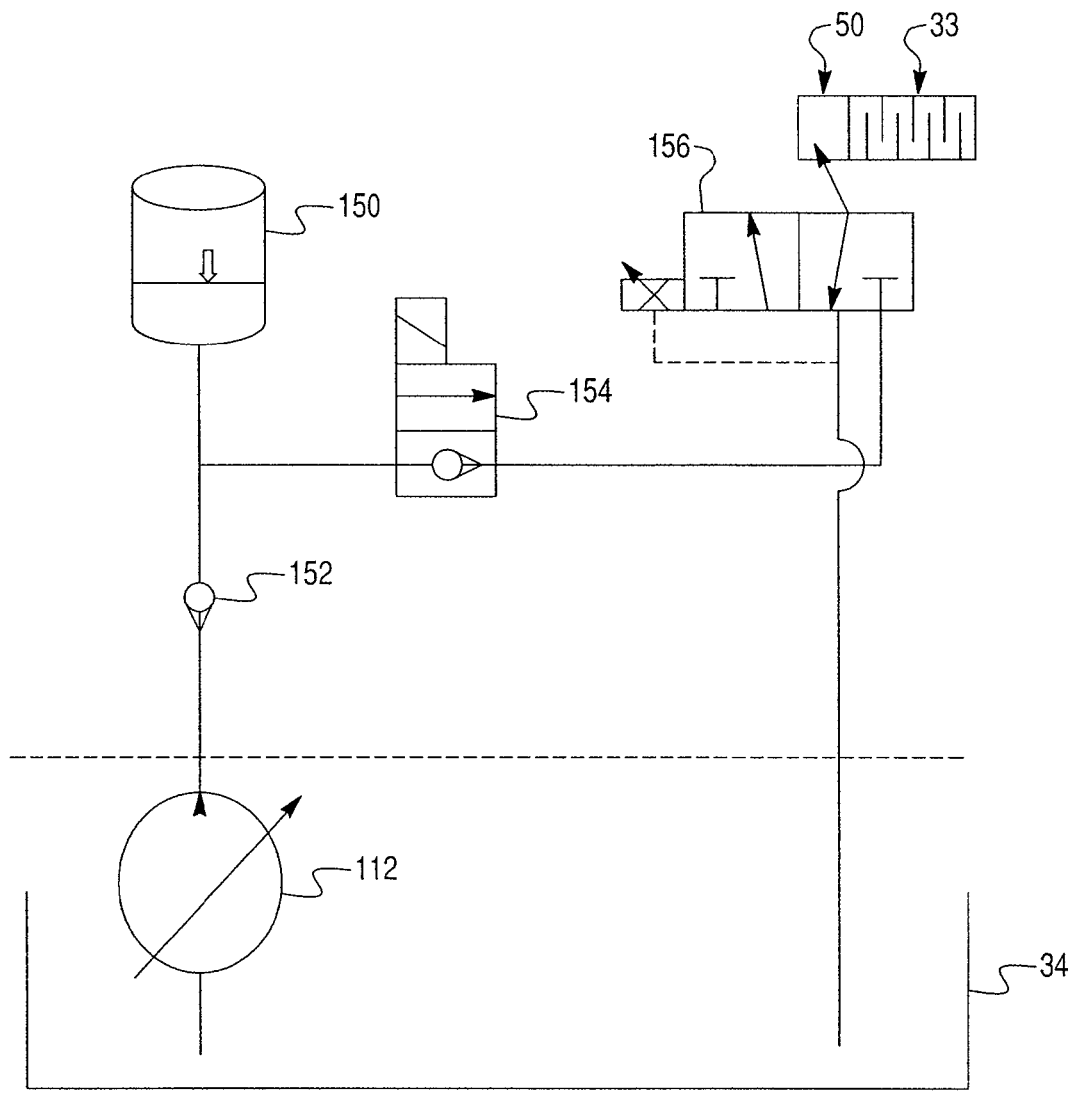
FIG. 11 is a schematic view of a pressurized hydraulic fluid supply system according to the second exemplary embodiment of the present invention.
Figure 12:
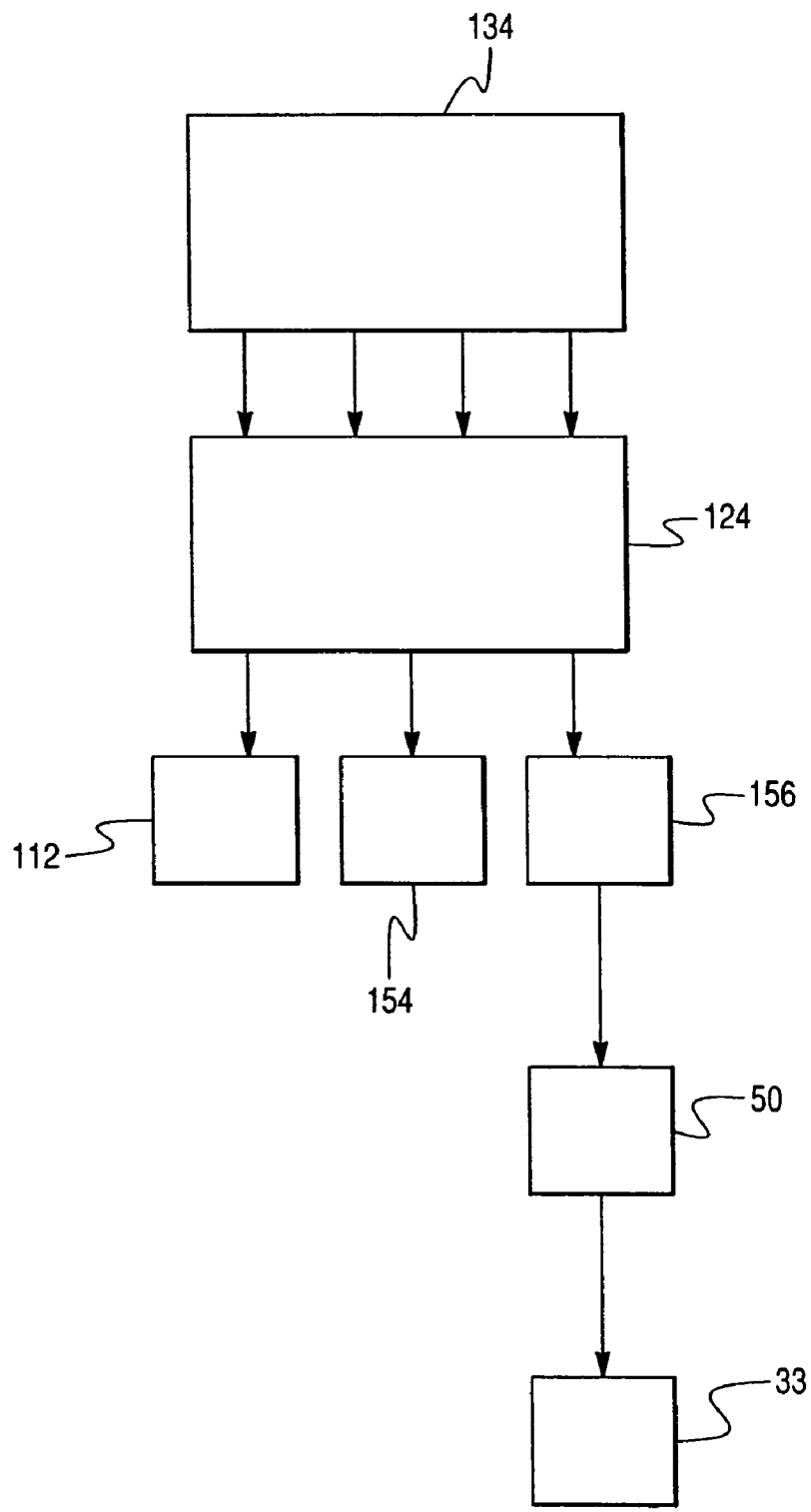
FIG. 12 is a schematic of an electronic control of the limited slip differential system according to the second exemplary embodiment of the present invention.

FIGS. 10-12 of the drawings illustrate the second exemplary embodiment of a front-wheel-drive (FWD) system of the motor vehicle. Components, which are unchanged from, or function in the same way as in the first exemplary embodiment depicted in FIGS. 1-9 are labeled with the same reference numerals, sometimes without describing detail since similarities between the corresponding parts in the two embodiments will be readily perceived by the reader.

The FWD system of the motor vehicle of the second exemplary embodiment of the present invention, generally depicted by the reference numeral 110, integrates therein a power transmission 30 of the FWD system 110. Preferably, the power transmission is in the form of an automatic transmission including a planetary gear system controlled by a number of hydraulically actuated clutches and brakes, and a hydraulic transmission pump 112 which provides pressurized hydraulic fluid to the transmission clutches and brakes.

An output from the power transmission 30 is connected to the front differential assembly 28 through a final drive (not shown). The front differential assembly 28 is drivingly connected to left-hand and right-hand front output axle shafts 46 and 47, respectively. In turn, the output axle shafts 46, 47 drive the front wheels 11 through suitable coupling means, such as constant-velocity joints (not shown).

The power transmission 30, the final drive, and the front differential assembly 28 are combined into a single unit defining a front-wheel-drive (FWD) transaxle unit connected directly to the engine 29. The FWD transaxles are commonly used in front wheel drive motor vehicles.

In the embodiment shown in FIG. 10, the hydraulic transmission pump 112 supplies pressurized hydraulic fluid through a front differential supply line 126 to the front controllable limited slip differential assembly 28. The front limited slip differential assembly 28 is disposed in a front transaxle housing adjacent to the transmission 30 between two output shafts 46, 47. The final drive connects the transmission 30 and the differential assembly 28. A pressure control valve (not shown) operably associated with the pump 112 controls the pressure within the front differential supply line 126.

As illustrated in detail in FIG. 11, the drive system 110 further includes a hydraulic accumulator 150 connected to the front differential assembly 28 and the transmission pump 12 through a check valve 152. In turn, both the hydraulic accumulator 150 and the transmission pump 112 are in selective fluid communication with the hydraulic clutch actuator 50 of the friction clutch assembly 33 through a solenoid valve 154 and a clutch control valve 156, such as a pulse-width-modulation (PWM) valve for setting the friction clutch assembly 33 in an engaged condition. More specifically, the solenoid valve 154 is provided for actuating the clutch actuator 50, while the clutch control valve 156 modulates the hydraulic pressure supplied to the clutch actuator 50. The hydraulic accumulator 150 is charged by the transmission pump 112 and the hydraulic fluid pressure is maintained in the hydraulic accumulator 150 by the check valve 152 and the solenoid valve 154. When the hydraulic pressure in the hydraulic accumulator 150 reaches a predetermined value, the transmission pump 112 no longer supplies the pressurized hydraulic fluid to the hydraulic accumulator 150. When the hydraulic accumulator 150 is discharged to pressurize the hydraulic clutch actuator 50 which compresses the friction clutch assembly 33, the transmission pump 112 recharges the hydraulic accumulator 150.

As best shown in FIG. 12, one or more active vehicle management systems 124, such as a stability control system, can be used with the present invention. The active vehicle management systems may incorporate the drive system including the controllable limited slip differentials 28, 56, 76 to optimize vehicle traction, maneuverability, and stability. In the present invention, the amount of torque transferred may be autonomously controlled through control algorithms in the vehicle management system 124. The vehicle management system 124 makes control commands based on one or more vehicle sensors 134 that communicate information regarding operational parameters to the vehicle management system 124.

The vehicle management system 124 may monitor parameters such as engine speed, vehicle speed, wheel rotational speed, yaw rate, lateral acceleration, steering angle, engine throttle position, brake application, ice detection, moisture detection, and/or driveline configuration. This information may be used to determine acceptable relative speed variations for shafts associated with the differential and to engage the differential to keep the differentials within the identified range. The vehicle management system 124 may use a mathematical algorithm to process the sensed information and communicate the resulting electrical commands to the hydraulic transmission pump 112, solenoid valve 154 and the clutch control valve 156. As described above, the hydraulic accumulator 150 then supplies the hydraulic pressure to the controllable limited slip differential assembly 28 to adjust performance of the drive system 110. Information regarding the operating status of the differential assembly 28 is subsequently communicated back to the vehicle management system 124 to allow the vehicle management system 124 to adjust and fine-tune the differential control mechanism.

In operation, the vehicle management system 124 signals the solenoid valve 154 and the clutch control valve 156 to fluidly connect the hydraulic accumulator 150 to the hydraulic clutch actuator 50 of the friction clutch assembly 33 of the front controllable limited slip differential assembly 28. As the hydraulic pressure within the hydraulic accumulator 150 reduces, the vehicle management system 124 closes the solenoid valve 154 so that the transmission pump 112 recharges the hy hydraulic accumulator 150 through the differential supply line 126.

One of ordinary skill in the art would appreciate that the second exemplary embodiment of the present invention integrating the hydraulic transmission pump 112 of the power transmission 30 into the FWD system 110 for selectively controlling the front limited slip differential assembly 28 is equally applicable for controlling the rear limited slip differential 56 and the intermediate limited slip differential 76.

Figure 13:
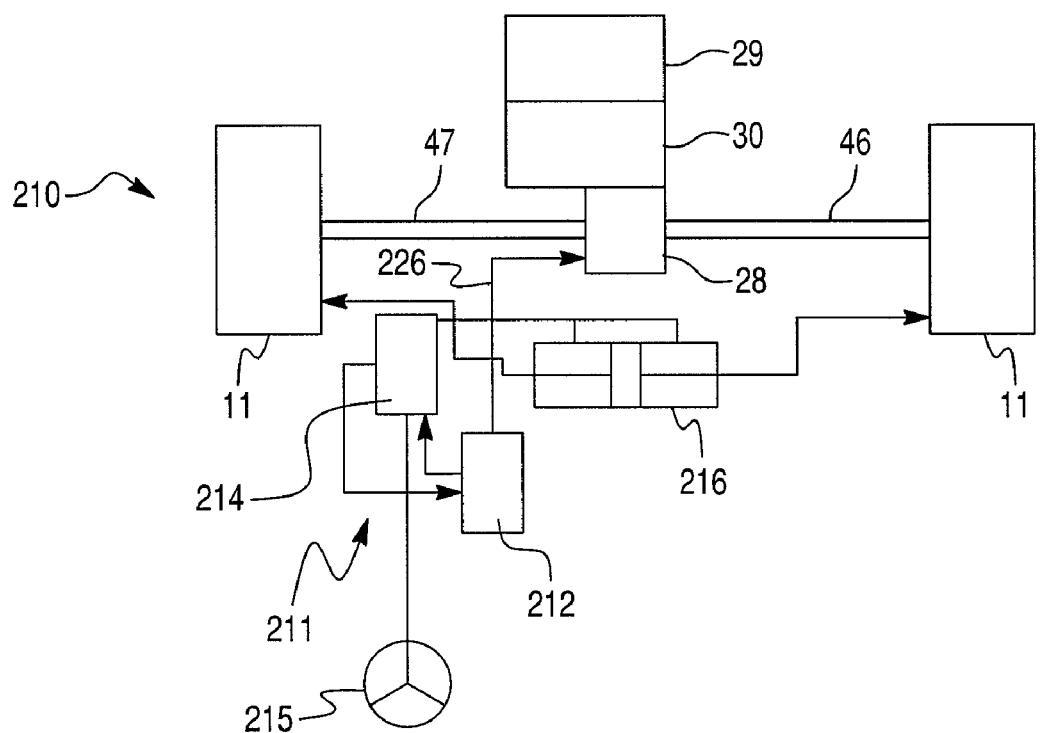
FIG. 13 is a schematic of a third exemplary embodiment of the present invention in the front-wheel-drive vehicle.
Figure 14:
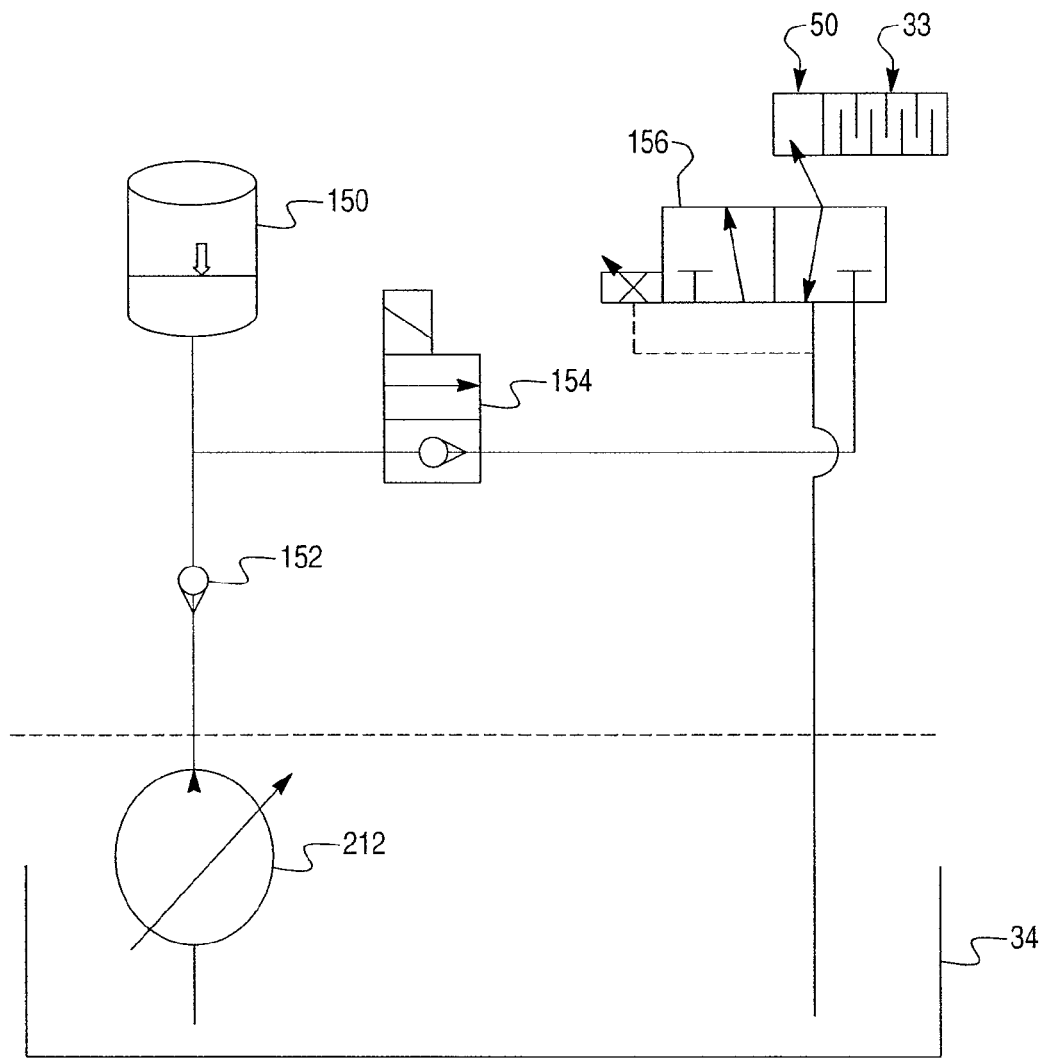
FIG. 14 is a schematic view of a pressurized hydraulic fluid supply system according to the third exemplary embodiment of the present invention.
Figure 15:
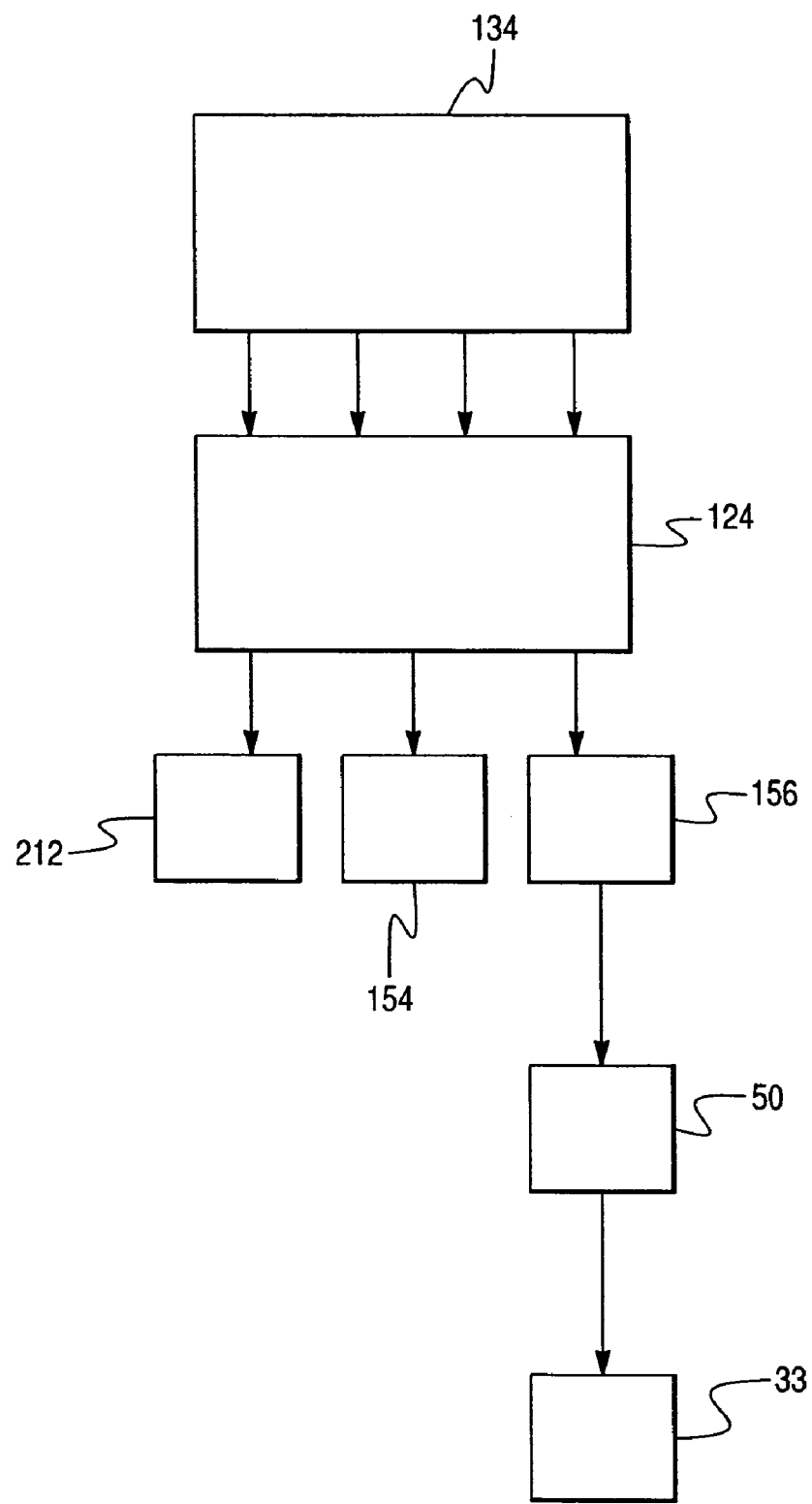
FIG. 15 is a schematic of an electronic control of the limited slip differential system according to the third exemplary embodiment of the present invention.

FIGS. 13-15 of the drawings illustrate the third exemplary embodiment of a front-wheel-drive (FWD) system of the motor vehicle. Components, which are unchanged from, or function in the same way as in the first and second exemplary embodiments of the present invention depicted in FIGS. 1-12 are labeled with the same reference numerals, sometimes without describing detail since similarities between the corresponding parts in the two embodiments will be readily perceived by the reader.

The FWD system of the motor vehicle of the third exemplary embodiment of the present invention, generally depicted by the reference numeral 210, integrates therein a power steering system 211. Preferably, the power steering system 211 is a hydraulically actuated power steering system including a hydraulic steering pump 212, a hydraulic fluid path switching valve 214 and a steering power cylinder 216. The hydraulic steering pump 212 provides pressurized hydraulic fluid to the steering power cylinder 216 through the switching valve 214 operated with a steering wheel 215.

In the embodiment shown in FIG. 13, the hydraulic steering pump 212 supplies pressurized hydraulic fluid through a front differential supply line 226 to the front controllable limited slip differential assembly 28. The front limited slip differential assembly 28 is disposed in a front transaxle housing adjacent to the transmission 30 between two output shafts 46, 47. A pressure control valve (not shown) operably associated with the hydraulic steering pump 212 controls the pressure within the front differential supply line 226.

As illustrated in detail in FIG. 14, the drive system 210 further includes a hydraulic accumulator 150 connected to the front differential assembly 28 and the steering pump 212 through a check valve 152. In turn, both the hydraulic accumulator 150 and the steering pump 212 are in selective fluid communication with the hydraulic clutch actuator 50 of the friction clutch assembly 33 through a solenoid valve 154 and a clutch control valve 156, such as a pulse-width-modulation (PWM) valve for setting the friction clutch assembly 33 in an engaged condition. The hydraulic accumulator 150 is charged by the steering pump 212 and the hydraulic fluid pressure is maintained in the hydraulic accumulator 150 by the check valve 152 and the solenoid valve 154. When the hydraulic pressure in the hydraulic accumulator 150 reaches a predetermined value, the steering pump 212 no longer supplies the pressurized hydraulic fluid to the hydraulic accumulator 150. When the hydraulic accumulator 150 is discharged to pressurize the hydraulic clutch actuator 50, the steering pump 212 recharges the hydraulic accumulator 150.

As best shown in FIG. 15, one or more active vehicle management systems 124, such as a stability control system, can be used with the present invention. The active vehicle management systems may incorporate the drive system including the controllable limited slip differentials 28, 56, 76 to optimize vehicle traction, maneuverability, and stability. In the present invention, the amount of torque transferred may be autonomously controlled through control algorithms in the vehicle management system 124. The vehicle management system 124 makes control commands based on one or more vehicle sensors 134 that communicate information regarding operational parameters to the vehicle management system 124.

The vehicle management system 124 may monitor parameters such as engine speed, vehicle speed, wheel rotational speed, yaw rate, lateral acceleration, steering angle, engine throttle position, brake application, ice detection, moisture detection, and/or driveline configuration. This information may be used to determine acceptable relative speed variations for shafts associated with the differential and to engage the differential to keep the differentials within the identified range. The vehicle management system 124 may use a mathematical algorithm to process the sensed information and communicate the resulting electrical commands to the hydraulic steering pump 212, the solenoid valve 154 and the clutch control valve 156. As described above, the hydraulic accumulator 150 then supplies the hydraulic pressure to the controllable limited slip differential assembly 28 to adjust performance of the drive system 210. Information regarding the operating status of the differential assembly 28 is subsequently communicated back to the vehicle management system 124 to allow the vehicle management system 124 to adjust and fine-tune the differential control mechanism.

In operation, the vehicle management system 124 signals the solenoid valve 154 and the clutch control valve 156 to fluidly connect the hydraulic accumulator 150 to the hydraulic clutch actuator 50 of the friction clutch assembly 33 of the front controllable limited slip differential assembly 28. As the hydraulic pressure within the hydraulic accumulator 150 reduces, the vehicle management system 124 closes the solenoid valve 154 so that the hydraulic steering pump 212 recharges the hydraulic accumulator 150 through the differential supply line 226.

One of ordinary skill in the art would appreciate that the second exemplary embodiment of the present invention integrating the hydraulic steering pump 212 of the steering system 211 into the FWD system 210 for selectively controlling the front limited slip differential assembly 28 is equally applicable for controlling the rear limited slip differential 56 and the intermediate limited slip differential 76.

For the foregoing reasons, it is clear that the invention provides a differential control system that may be used in a variety of applications. The invention may be modified in multiple ways and applied in various technological applications. The current invention may be customized as required by a specific operation or application, and the individual components may be modified and re-defined, as required, to achieve the effect and result. Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A drive system for use in a drivetrain of a motor vehicle, said drive system comprising:
    an input member;
    a pair of output members drivingly coupled to said input member;
    a differential gear assembly operatively disposed between said pair of output members to allow different speeds of rotation therebetween;
    a friction clutch assembly for selectively engaging and disengaging said input member with one of said output members, said clutch assembly comprising at least one first clutch member coupled to rotate with one of said output members and at least one second clutch member coupled to rotate with said input member;
    a fluid clutch actuator for selectively frictionally and variably loading said clutch assembly, said clutch actuator being selectively controlled in response to a difference in speed between said pair of output members to limit the relative rotation between said input member and one of said output members thereby limiting the speed differential between said output members;
    a power transmission functionally separate from said friction clutch assembly and said fluid clutch actuator, said power transmission including a fluid pump therein; and
    a fluid accumulator selectively communicating with said fluid clutch actuator for loading said friction clutch assembly, said fluid accumulator is selectively charged by said fluid pump;
    said fluid pump being a common source of pressurized fluid for said fluid clutch actuator and said power transmission of said motor vehicle, said fluid clutch actuator being actuated by fluid pressure generated by said fluid pump.

2. The drive system as defined by claim 1, further comprising a vehicle management system, said vehicle management system is in electrical communication with and controlling said pump so that said vehicle management system controls said power transmission and said clutch actuator.

3. The drive system as defined in claim 1, wherein said input member includes a differential case operatively associated with said differential gear assembly and said pair of output members.

4. The drive system as defined in claim 1, wherein said frictional clutch assembly is comprised of a multi-disk clutch pack.

5. The drive system as defined in claim 4, wherein said first clutch member comprises an inner clutch assembly comprising a plurality of inner clutch plates drivingly coupled to an inner clutch sleeve, said inner clutch sleeve is splined to one of said output shafts.

6. The drive system as defined in claim 5, wherein said second clutch member comprises an outer clutch plate assembly including a plurality of outer clutch plates drivingly coupled to said input member.

7. The drive system device of claim 1, wherein said fluid clutch actuator includes a piston reservoir and a piston disposed in said piston reservoir, said fluid pressure generated by said pump engages a first side of said piston, a second side of said piston engages a thrust plate and a thrust bearing, and
wherein increasing said fluid pressure causes said at least one first clutch member to engage said at least one second clutch member.

8. The drive system described in claim 7, wherein said at least one first clutch member is engageable with said at least one second clutch member such that said input member is directly coupled to one of said output members when said clutch actuator is activated.

9. The drive system described in claim 1, wherein said drive system is installed in a front-wheel drive vehicle so that said output members are connected to a set of front wheels of said motor vehicle, said drive system selectively controlling torque directed to said front wheels.

10. The drive system described in claim 9, wherein said drive system of said front-wheel drive vehicle includes said differential gear assembly controlled by said friction clutch assembly.

11. The drive system described in claim 10, wherein said drive system of said front-wheel drive vehicle includes a front wheel drive transaxle housing accommodating said differential gear assembly; and
wherein said friction clutch assembly is disposed outside said front wheel drive transaxle housing.

12. The drive system described in claim 1, wherein said drive system is installed in a rear-wheel drive vehicle so that said output members are connected to a set of rear wheels of said motor vehicle, said drive system selectively controlling torque directed to said rear wheels.

13. The drive system described in claim 12, wherein said drive system of said rear-wheel drive vehicle includes a differential assembly including said differential gear assembly controlled by said friction clutch assembly disposed in a differential case of said differential assembly.

14. The drive system described in claim 1, wherein said power transmission is an automatic transmission including said fluid pump.

15. The A drive system for use in a drivetrain of a motor vehicle installed in a driveline extending between a front axle and a rear axle of said motor vehicle, said drive system comprising:
an input member;
an output member drivingly coupled to said input member;
a friction clutch assembly for selectively engaging and disengaging said input member with said output member, said clutch assembly comprising at least one first clutch member coupled to rotate with said output member and at least one second clutch member coupled to rotate with said input member;
a fluid clutch actuator for selectively frictionally and variably loading said clutch assembly;
a power transmission functionally separate from said friction clutch assembly and said fluid clutch actuator, said power transmission including a fluid pump therein; and
a fluid accumulator selectively communicating with said fluid clutch actuator for loading said friction clutch assembly, said fluid accumulator is selectively charged by said fluid pump;
said fluid pump being a common source of pressurized fluid for said fluid clutch actuator and said power transmission of said motor vehicle, said fluid clutch actuator being actuated by fluid pressure generated by said fluid pump;
said input member and said output member being drivingly connected to one of said front and rear axles, said clutch assembly being disposed between said input and output members so that said clutch actuator is selectively and variably controlled in response to a sensed speed difference between said input and output members to limit the relative rotation between said input and output members and thereby limit the speed differential between said input and output members so that said drive system controls torque transferred between said input member and said output member.

16. A drive system for use in a drivetrain of a motor vehicle, said drive system comprising:
an input member;
a pair of output members drivingly coupled to said input member;
a differential gear assembly operatively disposed between said pair of output members to allow different speeds of rotation therebetween;
a friction clutch assembly for selectively engaging and disengaging said input member with one of said output members, said clutch assembly comprising at least one first clutch member coupled to rotate with one of said output members and at least one second clutch member coupled to rotate with said input member;
a fluid clutch actuator for selectively frictionally and variably loading said clutch assembly, said clutch actuator being selectively controlled in response to a difference in speed between said pair of output members to limit the relative rotation between said input member and one of said output members thereby limiting the speed differential between said output members;
a power transmission functionally separate from said friction clutch assembly and said fluid clutch actuator, said power transmission including a fluid pump therein, said fluid pump being a common source of pressurized fluid for said fluid clutch actuator and said power transmission of said motor vehicle, said fluid clutch actuator being actuated by fluid pressure generated by said fluid pump; and
a vehicle management system, said vehicle management system being in electrical communication with and controlling said pump so that said vehicle management system controls said power transmission and said clutch actuator.

* * * * *